April 10, 1962 W. W. MOE 3,029,387

ELECTRO-MECHANICAL DEVICE

Original Filed Sept. 3, 1953 8 Sheets-Sheet 1

INVENTOR
WILLIAM WEST MOE
BY Brumbaugh, Free, Graves & Donohue
ATTORNEY

INVENTOR.
WILLIAM WEST MOE
BY Brumbaugh, Free, Graves & Donohue
ATTORNEY

INVENTOR.
WILLIAM WEST MOE
BY Brumbaugh, Free, Graves & Donohue
ATTORNEY

April 10, 1962 W. W. MOE 3,029,387
ELECTRO-MECHANICAL DEVICE
Original Filed Sept. 3, 1953 8 Sheets-Sheet 4

INVENTOR.
WILLIAM WEST MOE
BY Brumbaugh, Free, Graves & Donohue
ATTORNEY

April 10, 1962 W. W. MOE 3,029,387

ELECTRO-MECHANICAL DEVICE

Original Filed Sept. 3, 1953 8 Sheets-Sheet 5

INVENTOR.
WILLIAM WEST MOE
BY Brumbaugh, Free Graves & Donohue
ATTORNEY

April 10, 1962 W. W. MOE 3,029,387

ELECTRO-MECHANICAL DEVICE

Original Filed Sept. 3, 1953

8 Sheets-Sheet 6

INVENTOR.
WILLIAM WEST MOE

BY Brumbaugh, Free, Graves + Donohue

ATTORNEY

April 10, 1962 W. W. MOE 3,029,387

ELECTRO-MECHANICAL DEVICE

Original Filed Sept. 3, 1953 8 Sheets-Sheet 7

INVENTOR.
WILLIAM WEST MOE
BY Brumbaugh, Free, Graves & Donohue

ATTORNEY

INVENTOR.
WILLIAM WEST MOE
BY Brumbaugh, Free, Graves & Donohue
ATTORNEY 3,029,387
ELECTRO-MECHANICAL DEVICE

William West Moe, Stratford, Conn., assignor to Time, Incorporated, New York, N.Y., a corporation of New York Original application Sept. 3, 1953, Ser. No. 378,294, now Patent No. 2,865,984, dated Dec. 23, 1958. Divided and this application July 15, 1958, Ser. No. 748,629
3 Claims. (Cl. 324—97)

The present invention relates generally to visual image transference apparatus adapted to convert intelligence embodied in an original visual subject into electric signals for subsequent conversion in turn into a replica of the visual original. More particularly, the present invention relates to new and improved systems of the above noted character in which provision is made to minimize loss of edge sharpness of the image between scanning of the visual original and the eventual reproduction of the replica thereof.

This application is a division of my co-pending application, Serial No. 378,294, filed September 3, 1953, now Patent No. 2,865,984.

In visual image transference systems of the type described, during image transference loss of sharpness tends to occur for regions of the scanned visual subject corresponding to an "edge," or sharp change in tone density between adjoining areas of the subject. One factor contributing to this loss in sharpness concerns the electro-optical scanners used as the front end of such systems. In such scanners the scanning aperture, being of finite size, often has a larger diameter than the width of the edge between relatively light and dark areas of the scanned original. It follows that when an edge is in the visual field of the aperture, the light passed by the aperture derives from both the light and dark areas to be associated in an admixture which is irresolvable to the employed light receiving element (as, for example, a photocell). Hence, as long as the edge is in the aperture field, the photocell produces a signal representing as to tone density, neither a light area nor a dark area, but instead a tone intermediate the two.

Since the edge is viewed by the aperture for a scanning travel thereof equal to the aperture diameter, the photocell produces the mentioned intermediate tone signal for the entire interval required for the aperture to make this travel. Accordingly, the signal generated by the photocell during scanning of an edge does not properly represent the sharp change in tone density of the edge, but represents instead a gradual change in tone density, as would be characteristic of a tone density transition zone lying between a light area and a dark area and having a width equal to the diameter of the scanning aperture.

As to other factors contributing to loss of sharpness of the image, first, an effect similar to that described occurs with regard to the aperture or its equivalent (such as the cathode ray tube beam spot in a television receiver) used to visually reproduce the transmitted image. Second, the finite band width of the image transference system often does not permit of signals having as sharp change in characteristic as the change in tone density at an edge. Third, where a half tone replica is produced, the discontinuous dot characteristic of the half tone surface causes a loss in edge sharpness.

Accordingly, it is an object of the invention to provide methods and apparatus for overcoming the above noted difficulties in maintaining edge sharpness in visual image transference systems.

Another object of the invention is to provide methods and apparatus for maintaining edge sharpness between the conversion of the intelligence embodied in an original visual subject into electric signals, and the reconversion of these electric signals into a visual replica of the original.

A further object of the invention is to provide methods and apparatus of the above noted character for maintaining edge sharpness irrespective of the orientation of an edge with respect to the direction of scanning.

These and other objects of the invention are obtained by providing, in conjunction with a system which converts the intelligence embodied in a visual subject into electric signals, modifies the signals and then supplies them to an output, a means which, whenever the edge of a visual subject is scanned, superposes at this output a compensating signal upon the image carrying signal of the system. This compensating signal is of a nature to restore the loss of edge sharpness incurred by the image carrying signal in the main channel of the system.

The invention may be better understood from the following detailed description of a representative embodiment thereof taken in conjunction with the accompanying drawings in which.

Figure 1:
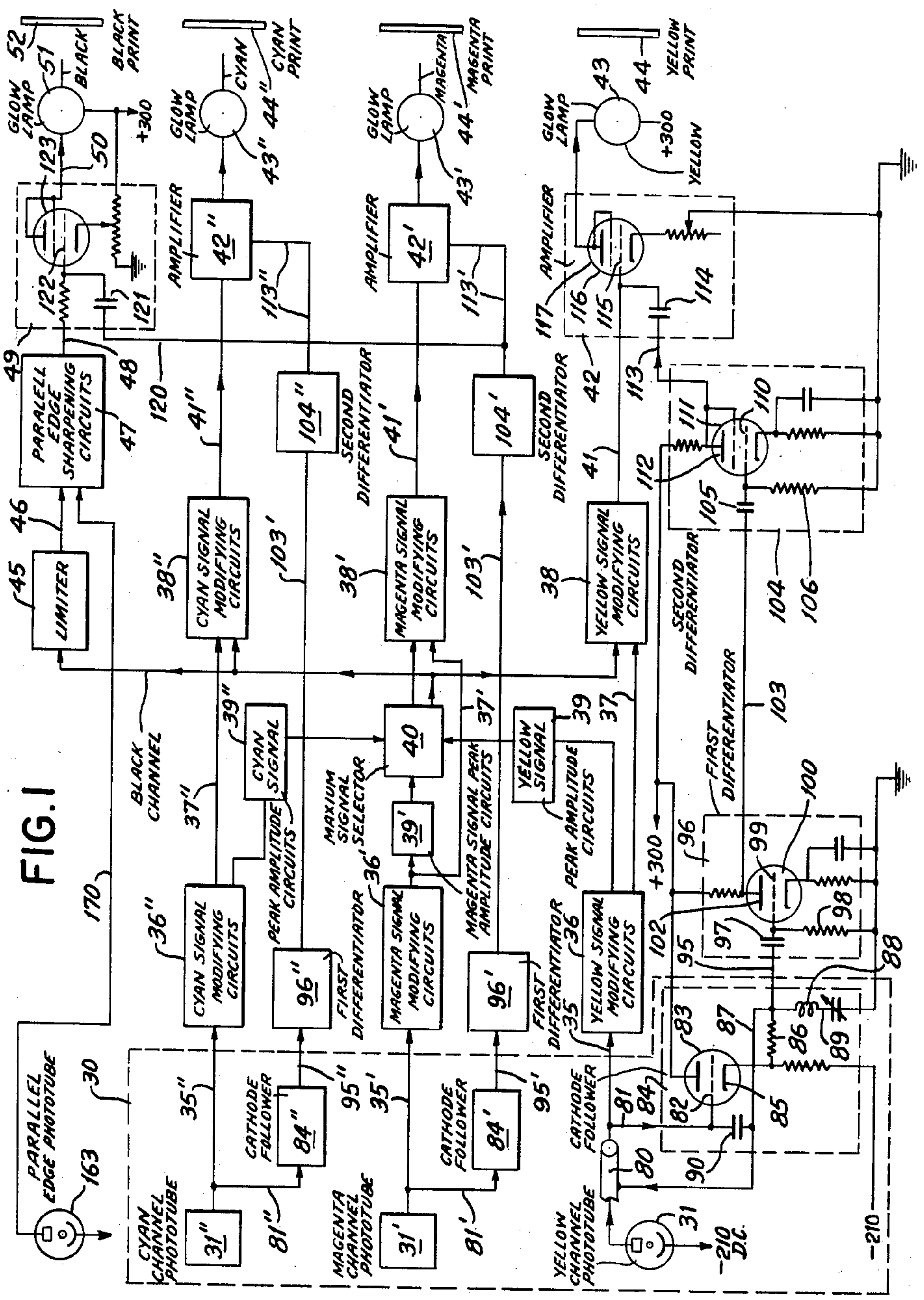
FIGURE 1 represents in block diagram form certain portions of an electronic printer apparatus for producing monochrome half-tone negatives or positives from a colored original, and in schematic diagram form the transverse edge-sharpening circuits associated with this apparatus.
Figures 2, 3A, 3B, 3C, 3D, 3E, 3F, 3G, 4:
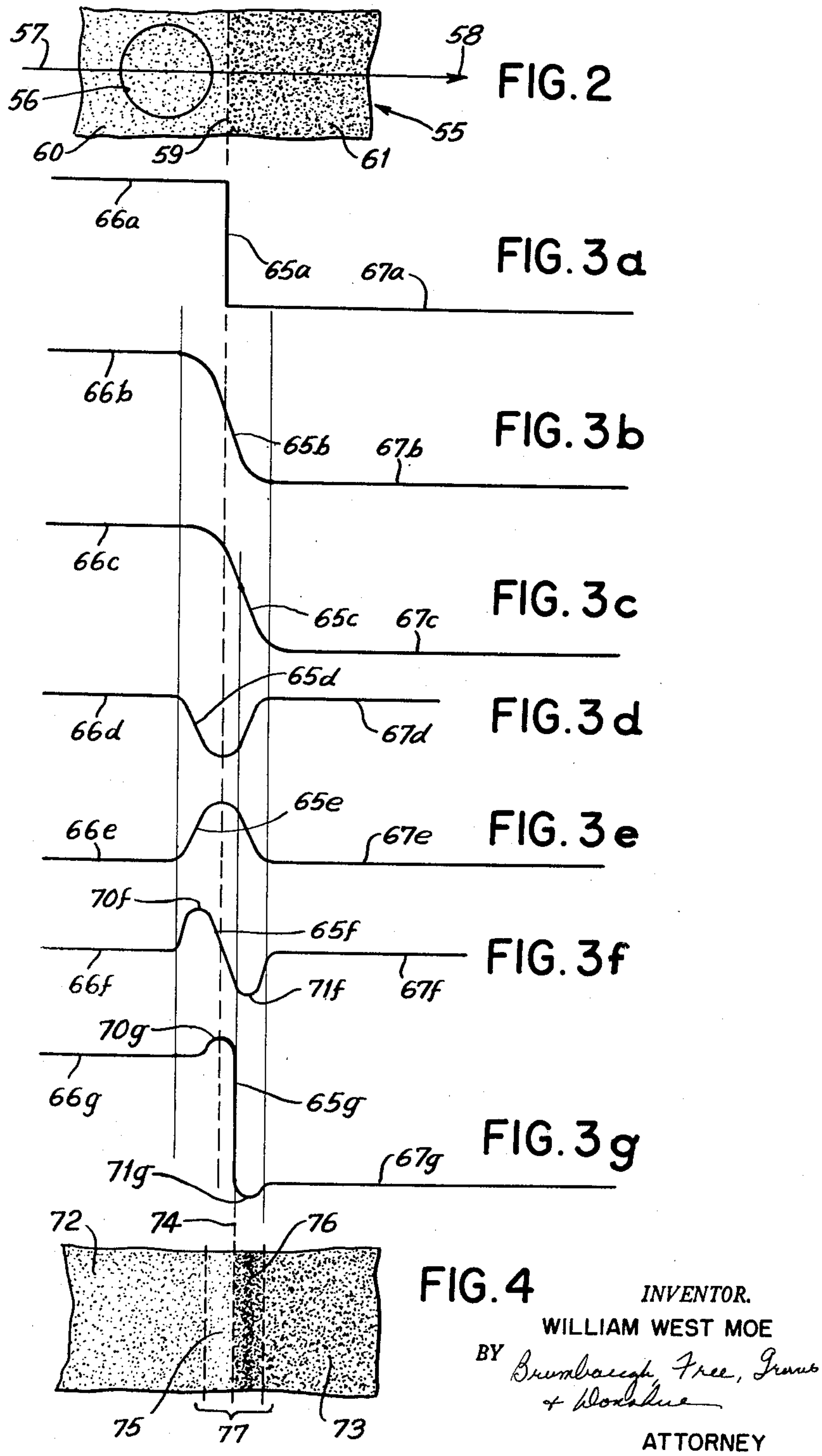
FIGURE 2 illustrates a portion of a visual subject having an edge lying transversely across the path of a scanning aperture which travels from a light to a dark area.
Figures 5, 6A, 6B, 6C, 6D, 6E, 6F, 6G, 7:
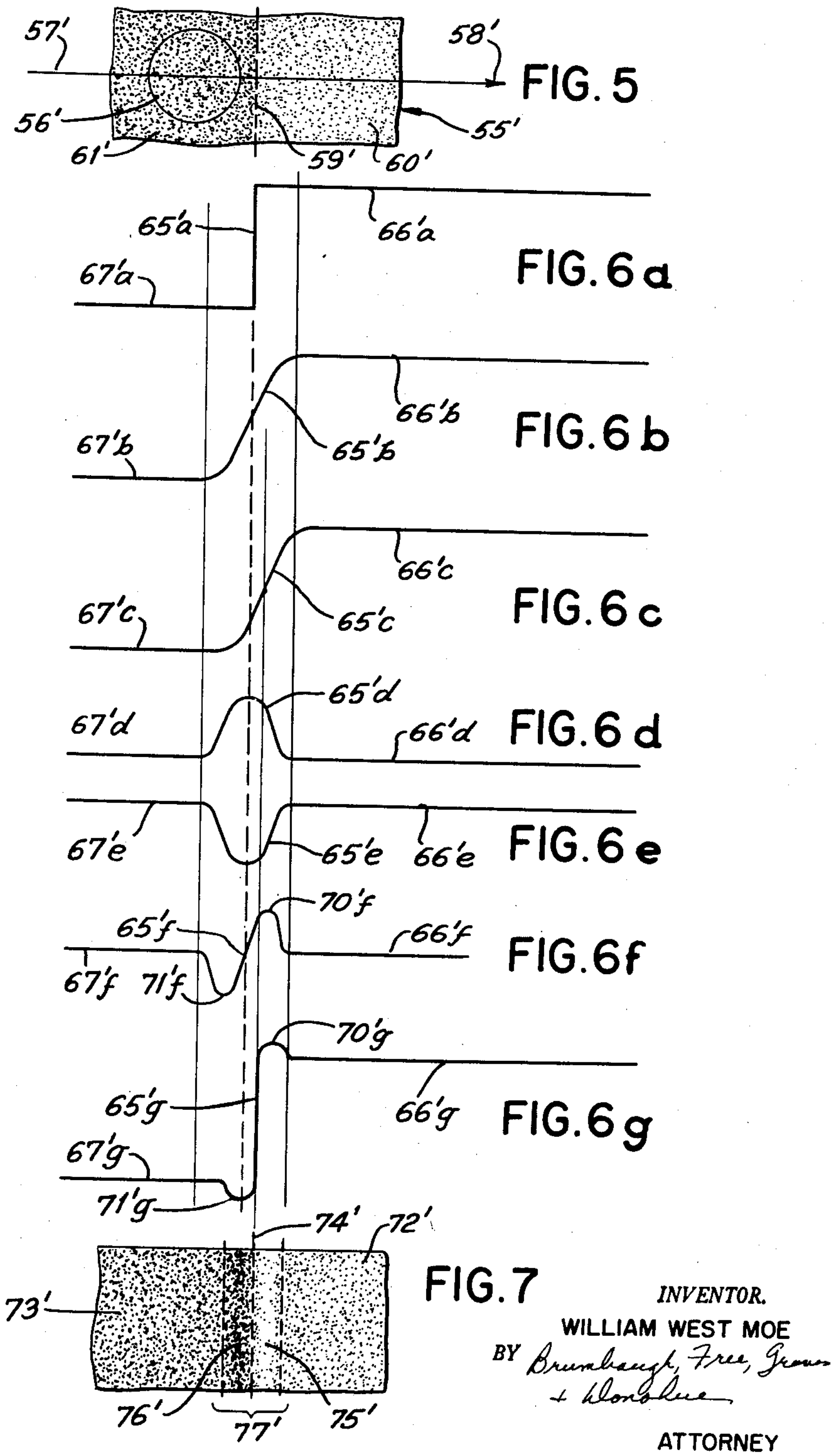
Figure 8:
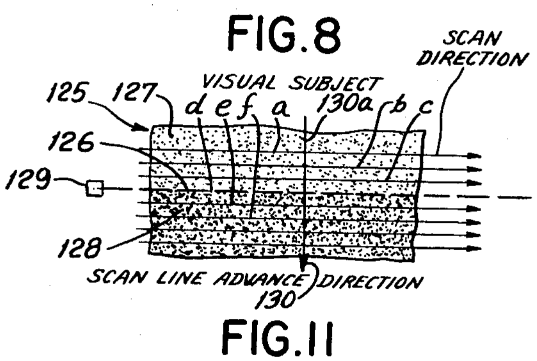
Figure 9:
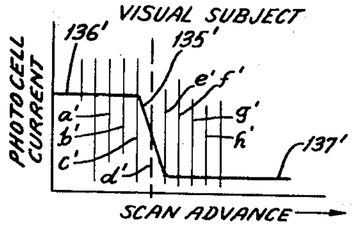
Figure 11:
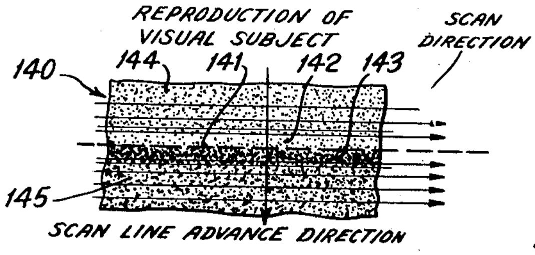
Figure 10:
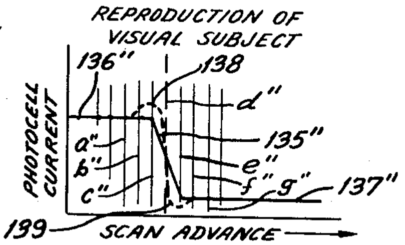
Figure 12:
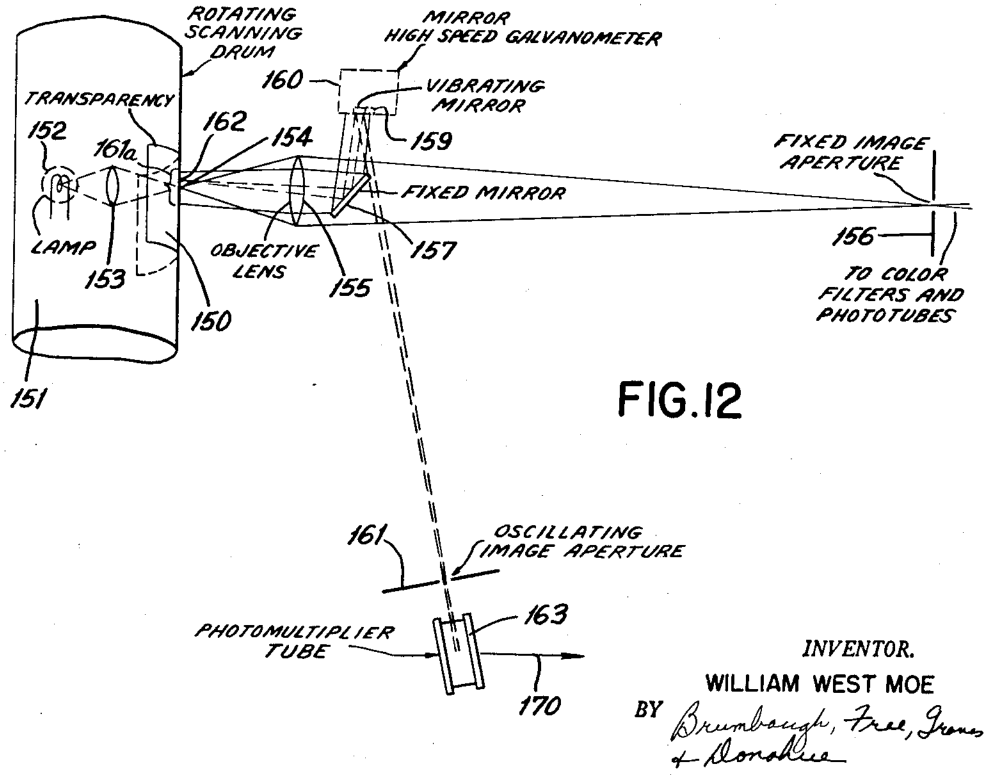
Figure 13:
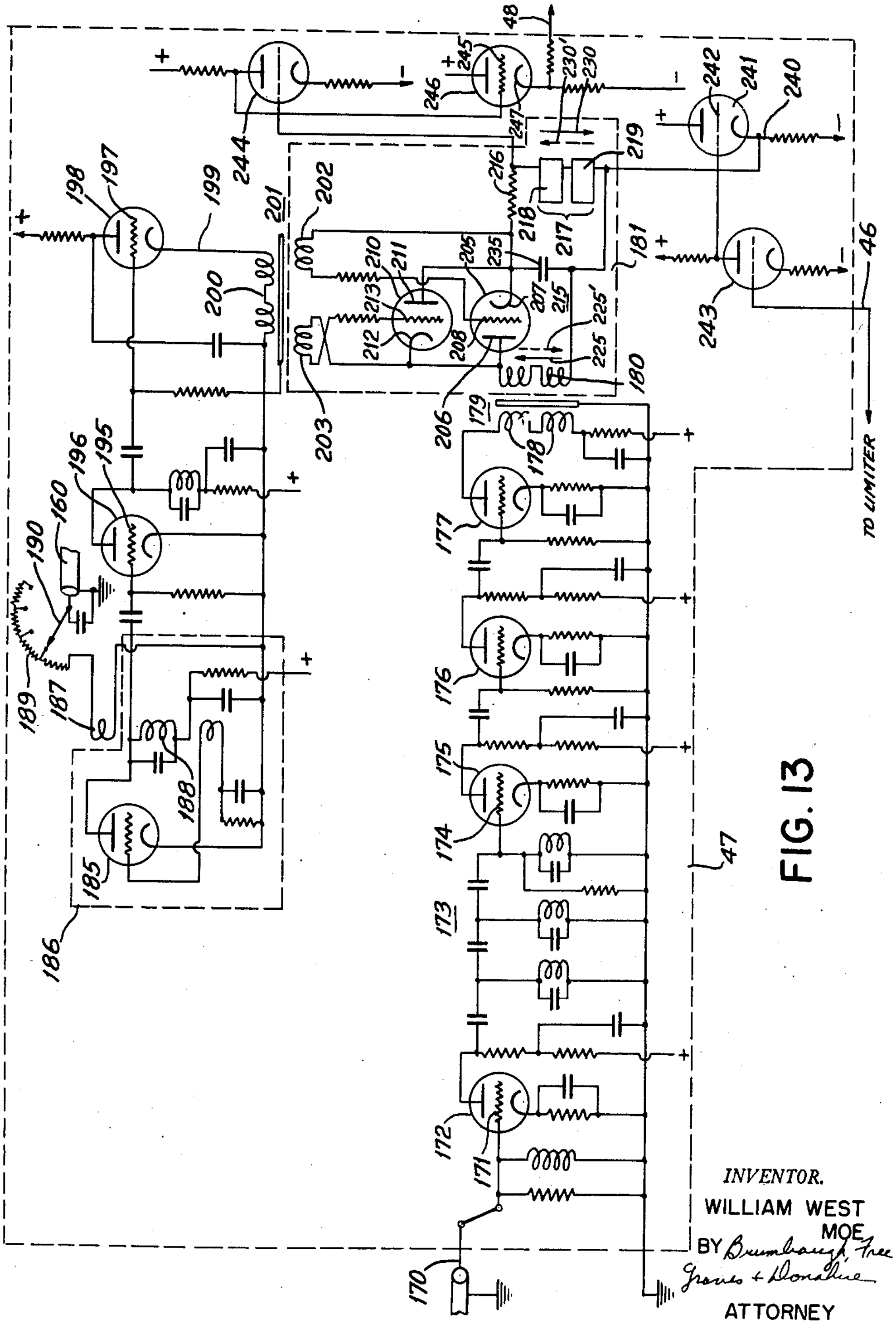
Figures 19, 20:
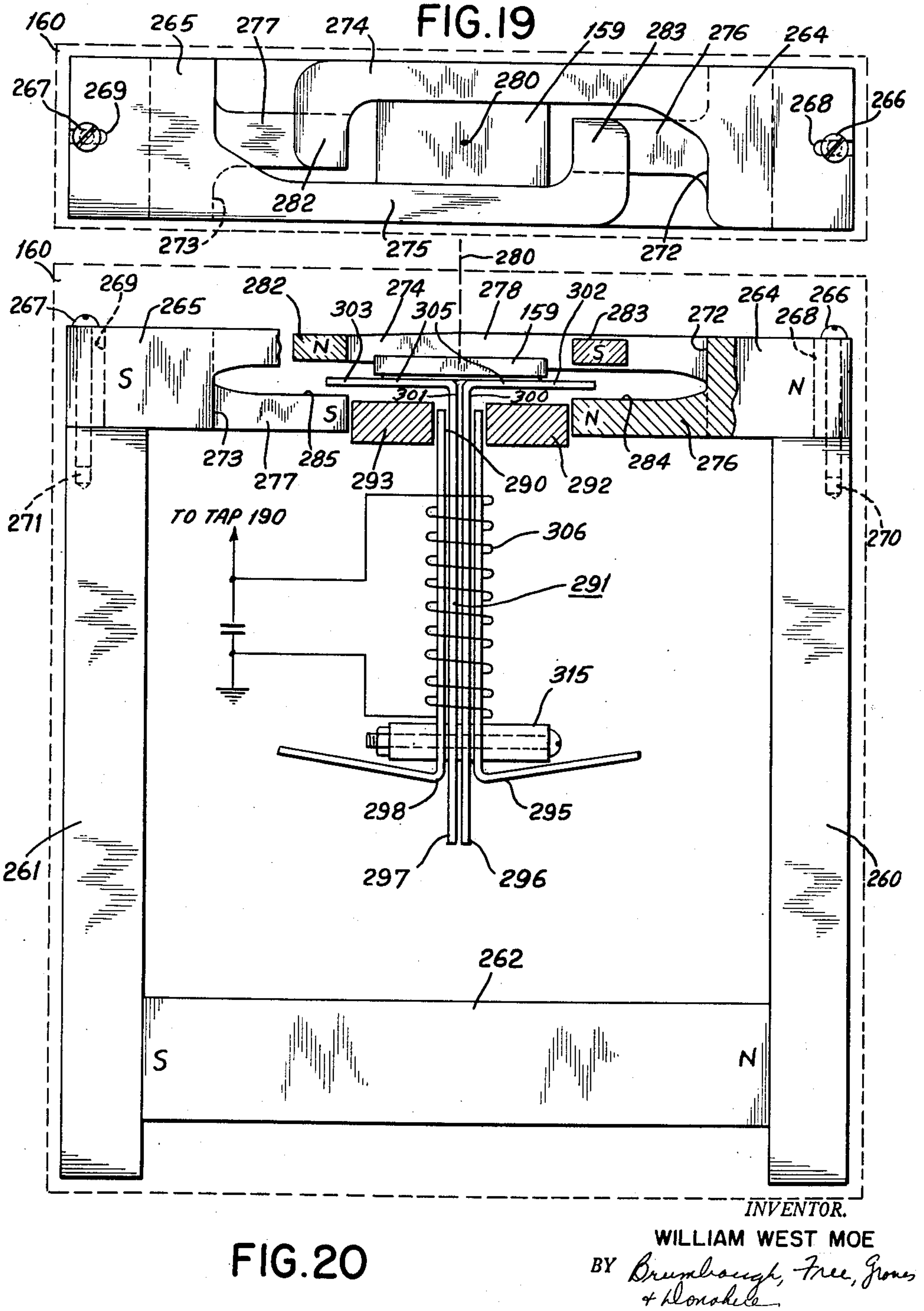
Figure 21:
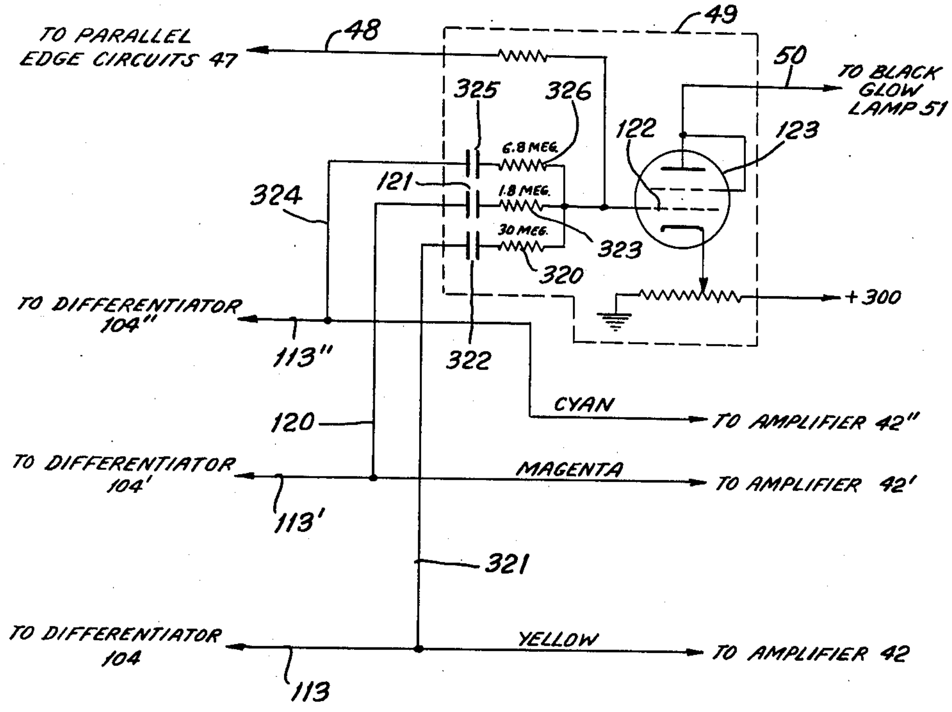

FIGURES 3*a*–3*g*, inclusive, illustrate wave forms which indicate for the transverse edge of FIGURE 2 how, by the use of edge correcting signals, edge sharpness may be retained in the course of visual image transference;

FIGURE 4 represents a positive replica of the portion of the visual subject shown in FIGURE 2, the replica having a reproduced edge and an edge accentuating zone;

FIGURE 5 illustrates a visual subject portion similar to that shown by FIGURE 2 except that the positions of the light and dark areas are reversed;

FIGURES 6*a*–6*g*, inclusive, illustrate wave forms of signals derived from the visual subject portion of FIGURE 5 but otherwise respectively corresponding to the wave forms of FIGURES 3*a*–3*g*, inclusive;

FIGURE 7 illustrates a positive replica of the visual subject portion shown in FIGURE 5, the replica being reproduced from the edge-corrected image carrying signal shown by FIGURE 6*g*;

FIGURE 8 represents a portion of a visual subject in which an edge between a light and a dark area lies parallel to the scanning path traversing the subject;

FIGURE 9 represents a plot of the scanning photocell output signals respectively produced during the separate scannings across the visual subject portion of FIGURE 8;

FIGURE 10 represents a plot of image carrying signals derived from the output signals shown by FIGURE 9, the image carrying signals having applied thereto the necessary signal correction to provide for proper parallel edge reproduction and accentuation;

FIGURE 11 represents a positive replica of the visual subject portion of FIGURE 8, the replica being produced from the corrected image-carrying signals of FIGURE 10;

FIGURE 12 illustrates in diagrammatic form a prescanner optical system which, to provide parallel edge sharpness correction, is adapted to sample the visual field on either side of a scanning path taken across a visual subject;

FIGURE 13 represents, in schematic diagram form, circuits adapted, responsive to light energy received by the sampling action of the optical system of FIGURE 12, to produce parallel edge sharpness correction signals;

FIGURES 14*a*–18*a*, inclusive, 14*b*–18*b*, inclusive, and 14*c*–18*c*, inclusive, represent diagrams explanatory of the mode by which parallel edge correction is obtained;

FIGURE 19 is a plan view of a high-speed galvanometer for driving the sampling mirror in the optical system of FIGURE 12;

FIGURE 20 is a front elevation of the high-speed galvanometer with a part thereof being shown in cut-away section; and, FIGURE 21 represents a modified form of the printer of FIGURE 1, the modified form being so adapted to provide edge sharpness restoration through the black channel only.

*General Description*

While the invention may be applied to any visual image transference system, including both black and white and color systems, for purposes of illustration it will be described herein in connection with an electronic color printer for producing a plurality of monochrome separation half-tone negatives or positives from a colored original visual subject. The electronic printer to be described is of the so-called "four color" type utilizing the three subtractive colors, yellow, magenta and cyan, and, as a fourth color, black. The details of the printer referred to are fully described in my copending application Serial No. 251,898, filed October 18, 1951, and entitled "High Frequency Carrier System for Electronic Color Correction System," now Patent No. 2,873,312, but to facilitate understanding of the present invention, a brief outline is given below as to the salient features of the printer.

Referring to FIGURE 1, the box 30 designates convenient scanning mechanism which may be of any suitable type, such as that shown in United States Patent No. 2,253,086, for example. Its purpose is to scan elemental areas of a colored original and to provide three electric signals corresponding to the three primary color components in each area scanned. The three output signals for the scanner 30 are derived from three similar photosensitive scanning elements 31, 31' and 31'' (for example, photomultiplier tubes) within the scanner 30.

The three scanner output signals so derived from the three scanning phototubes 31, 31', 31'' are fed respectively into three electrical channels which will be designated herein the yellow, magenta and cyan channels, in accordance with the color of the printing plates produced by the respective channels. Certain elements in each of the three channels are identical. Accordingly, when possible, only the yellow channel will be described in detail and corresponding elements in the magenta and cyan channels will be designated by corresponding prime and double prime characters respectively.

In the yellow channel the image-carrying output signal from the scanning phototube 31 is supplied by a lead 35 to a first set of yellow signal modifying circuits 36. These circuits 36, in operating on the yellow signal, perform, among other functions, impression of the output signal from the phototube as a modulation upon a high frequency carrier.

Continuing to trace the yellow signal through its main channel, the signal flows by a lead 37 from the output of the first set of modifying circuits 36 to the input of a second set of yellow signal modifying circuits 38. Additionally, a signal is supplied from the output of the first set of modifying circuits 36, through an assembly of peak amplitude deriving circuits 39, to a maximum signal selector circuit 40 also receiving signals from the magenta and cyan peak amplitude deriving circuits 39' and 39''. The operations of the peak amplitude deriving circuits and the maximum signal selector circuit are fully explained in the referred to copending application.

The output signal from the maximum signal selector circuit is used to produce a black separation negative and also to produce "under-color removal" in essentially the same manner as described in the copending United States application of William West Moe and Vincent C. Hall, Serial No. 14,008, filed March 10, 1948 (now United States Patent 2,605,348, issued on July 29, 1952, and entitled "Color Separation Negative"). In the method there disclosed, the black signal is derived by selecting the instantaneous maximum modulation component in each of the three channels and the signals in the three channels are reduced as a function of the black signal in order to effect so-called "under-color removal."

For under-color removal, the output signal from the maximum signal selector circuit 40 (FIG. 1) is supplied as three separate inputs to the three second sets of signal modifying circuits 38, 38', 38''. After performance of additional operations in these circuits, the three image carrying color signals are supplied (with the high frequency carriers eliminated) by respective leads 41, 41', and 41'' to three respective D.C. amplifiers 42, 42' and 42''. The outputs of these amplifiers energize three respective glow lamps 43, 43' and 43'' which serve to respectively expose the three (yellow, magenta and cyan) photographic emulsions 44, 44' and 44'' in the usual manner. Half tone prints may be produced from the photosensitive emulsions in the usual manner.

The output signal from the maximum signal selector circuit 40 is also supplied to a limiter circuit 45 which may be considered to divert the signal passing therethrough into a "black channel." In the black channel the black image-carrying color signal passes by a lead 46 to a set of circuits 47 adapted to restore edge sharpness for edges or edge components lying along or parallel to a scanning path. These circuits 47, referred to hereafter as parallel edge circuits, will be later more fully described. From the output of the parallel edge circuits 47 the black image-carrying signal passes by a lead 48 to the input of an amplifier 49. From the output of the amplifier 49 the image-carrying signal is fed by a lead 50 to a glow lamp 51 adapted to expose the black print 52.

In operation, the glow lamps 43, 43', 43'' and 51 respectively expose four yellow, magenta, cyan and black color separation half-tone positives or negatives 44, 44', 44'' and 52, in synchronism with the scanning of the colored original visual subject by the scanner 30.

*Principle of Transverse Edge Correction*

As stated, in the electronic color printer described and in other types of visual image transference systems, loss of edge sharpness tends to occur in the system between the scanning of an original visual subject and the reproduction of a replica or copy of that subject. The factors contributing to this loss in edge sharpness and the compensating means therefore will be more clearly understood from a consideration of FIGURES 2, 3*a*–3*g*, inclusive, and 4. As to the mutual relations therebetween, the mentioned figures are in vertical registry to have the horizontal direction of each represent, to a common scale, distance on a scanning path across a visual subject. In the case of FIGURES 3*a*–3*g*, inclusive, the vertical direction represents the amplitude of an electrical signal.

Referring now to FIGURE 2, the figures shows a portion 55 of a visual subject traversed by a scanning aperture 56 along a path 57 in the direction indicated by the arrow 58. On the visual subject portion 55 an edge 59, forming a boundary between light and dark areas 60 and 61 of accordingly relatively contrasting tone density, lies across the scanning path 57 in normal relation thereto. Such type edge will be hereafter referred to as a "transverse" edge, while edges lying along or parallel to, a scanning path will be referred to as "parallel" edges. Edges fitting neither of the above categories will be referred to hereafter as "skewed" edges. Unless otherwise noted, where the descriptive matter to follow refers to a transverse or a parallel edge the description applies with equal force to, respectively, the transverse and parallel components of a skewed edge.

In FIGURE 2, it is apparent that the aperture 56 in crossing the edge 59 moves from the light area 60 to the dark area 61, and that, as to the visual subject, the tone density transition between the areas, as represented by the edge 59, is substantially instantaneous in space occurrence. In order for the output signal from scanning photocell (say phototube 31 of FIG. 1) to accurately represent this instantaneous transition in tone density, the wave form of the output signal (which in amplitude is inversely related to the represented tone density) should be, in time occurrence, of the configuration shown in FIGURE 3*a*, where a transition line 65*a* of substantially infinite slope connects an initial high signal level region 66*a* with a subsequent low signal level region 67*a*. For reasons stated, however, in practice the output signal of a scanning photocell cannot accurately follow a sharp change in tone density. Instead, in practice, the output signal has a wave form (FIG. 3*b*), in which a finite slope transition line 65*b* connects the high and low signal level regions 66*b* and 67*b*.

In the course of passing from the output of the photocell through the image transference system circuits, because of the electrical inertia thereof, the signal of FIG. 3*b* will inevitably be delayed and the slope of the transition line decreased. Hence, at the output of the mentioned circuits the image carrying signal will have a wave form as in FIG. 3*c*. In this latter figure, the signal in wave form no longer represents the sharp change in tone density of an edge but, instead, as shown by line 65*c*, the gradual change in tone density of a transition zone lying between two areas (shown by lines 66*c* and 67*c*) of contrasting tone density.

The loss in edge sharpness inherent in the wave form of FIGURE 3*c* may be electrically compensated for by deriving from the signal of FIGURE 3*b* a first differential signal (FIG. 3*d*). This first differential signal is inverted (FIG. 3*e*) and differentiated again to produce an inverted second differential signal (FIG. 3*f*). For edge sharpness correction, this latter signal is superposed on the delayed image-carrying signal (FIG. 3*c*) at the output of the image-transference system circuits. There results for the image transference system a combined output signal (FIG. 3*g*).

Considering this combined output signal, note that the edge representing portion thereof, namely transition line 65*g*, between the high and low signal level regions (66*g* and 67*g*) is of considerably increased slope as compared to the transition line 65*c* of FIGURE 3*c*. This increased slope in itself is an important factor in reestablishing, as to the image carrying signal, the edge sharpness which would otherwise be lost by the image transference system. In addition, note that in the combined signal (FIG. 3*g*), the wave form proximate the transition line assumes light and dark tone density peaks 70*g* and 71*g* at respectively the light and dark tone ends of the transition line. The creation of such contrasting tone peaks, over-accentuating the tone density of the visual subject areas on either side of an edge, is possible for the reason that, in practice very few visual subjects or replicas reproduced therefrom have areas which are completely "white" or "black" in tone density.

Over-accentuation of edge sharpness, as described, is paritcularly desirable where a visual image transference system is adapted to reproduce half-tone prints from a scanned original. Inherently, half-tone prints, because of the discontinuous dots on the surface thereof, tend to suffer from an additional loss of edge sharpness. By over-accentuation, however, this supplementary loss can be largely corrected to the eye of a viewer of the half-tone print, since the over-accentuated tone density peaks on either side of the true edge position create the optical illustration that the edge is sharper than in fact it is. Of course, when desirable, over-accentuation can be eliminated by decreasing in a conventional manner the amplitude of the inverted second differential signal (FIG. 3*f*).

Referring now to FIGURE 4, the figure represents, as a positive replica, the reproduction from the combined signal (FIG. 3*g*) of the portion 55 of the original visual subject (FIG. 2). In FIGURE 4, a light tone area 72 and a dark tone area 73 lie to either side of a boundary 74 equivalent to a reproduced edge. Between this boundary 74 and the light area 72 there is present a marginal strip 75 of lighter tone density than the light area itself. Similarly, between this boundary 74 and the dark area 73 there is present a marginal strip 76 of darker tone density than the dark area itself.

The mentioned light strip 75 and the dark strip 76, corresponding in the combined signal (FIG. 3*g*) to the contrasting peaks 70*g* and 71*g* on either side of the amplitude transition line, form together an edge accentuating zone 77 coextensive with the position of the edge 59 when shifted slightly in accordance with the signal delay occurring between the waveforms of FIGS. 3*b* and 3*c*. This edge accentuating zone 77 heightens the impression to a viewer of the presence and sharpness of the edge, in fact, reproduced.

FIGURES 5, 6*a*–6*g*, inclusive, and FIGURE 7 correspond respectively as to subject matter with FIGURES 2, 3*a*–3*g*, inclusive, and 4, with the exception that in the higher numbered group of figures the scanning aperture crosses the original edge 59', shown, by moving from a dark area 61' to a light area 60'. The corresponding features of the lower and higher numbered group of figures is indicated by designating corresponding parts in the lower and higher groups with the same number, but with the part number of the lower and higher groups being unprimed and primed respectively. In view of the foregoing description as to the mutual relationship between the lowered numbered group of figures, it is believed that the mutual relations between the higher numbered group of figures is self-explanatory.

*Transverse Edge Correction Circuits*

Reverting to FIGURE 1, there is shown in schematic form one embodiment of an assemblage of circuits adapted to restore transverse edge sharpness in the manner outlined above. While these transverse edge sharpening circuits are disclosed in detail in the copending application referred to, as a matter of convenience the description of the circuits is also set forth herein. It is to be understood that, unless otherwise noted, the description of the transverse edge sharpening circuits for one color channel of the printer, say the yellow channel, applies as properly to the other printer color channels.

In FIGURE 1, as stated, the yellow channel receives its input from a photosensitive device 31 (such as a conventional photomultiplier tube, for example), which forms part of the scanner 30. The photomultiplier tube circuit is arranged so that a negative voltage of, say, −210 volts D.C. is applied to the cathode dynode elements, while the multiplier anode is connected by a shielded lead 35 to supply the yellow channel output signal from the scanner 30 to the yellow signal modifying circuits 36. In the circuits 36, as stated, the signal from the photomultiplier tube 31 is impressed as a modulation upon high frequency carrier.

In order to eliminate capacity loading, a metal cable shield 80 for the lead 35 is preferably driven in correspondence with the output signals from the photomultiplier tube 31. To this end, the signal upon the lead 35 is fed by a lead 81 to the control grid 82 of a conventional electron tube 83 which is connected in the well known manner to form a cathode follower stage 84. One output of the tube 83 is supplied from the cathode 85 thereof through a resistor 86 and a lead 87 to the sheath 80, a series resonant circuit comprising an inductance 88 and a variable capacitance 89 being connected between the lead 87 and ground to remove from the cable sheath 80 the high frequency carrier signals which may be fed back towards the scanner 30 from the yellow signal modifying circuits 36. As an additional measure for eliminating the high frequency carrier, preferably a condenser 90 is connected between the lead 87 and the control grid 82 of the tube.

Since, as stated, sharp edges in the original subject being scanned may tend to lose some of their sharpness in transmission through the multiplicity of electronic circuits comprising the printer apparatus heretofore described, it is desirable to provide means for restoring the sharpness to such edges. This may be accomplished by connecting the output of the cathode follower tube 83 at the lead 87 by way of another lead 95 to a differentiating stage 96 incorporating a series condenser 97 and a shunt resistor 98. When in the presence of a scanned transverse edge the photomultiplier tube 31 produces a signal of the type shown in FIGURE 3*b*, the condenser 97 and resistor 98 responsively produce (FIG. 3*d*) the first differential of the photomultiplier signal.

The first differential signal appearing across the resistor 98 is impressed on the control grid 99 of a conventional electron tube 100 connected in the differentiating stage 96 to act in the usual manner as an amplifier. The first differential signal, amplified and inverted (as shown by FIG. 3*e*), by passage through the tube 100 is taken from the plate 102 of tube 100 and is fed by a conductor 103 to a second differentiating stage 104 incorporating a series condenser 105 and a shunt resistor 106. The condenser 105 and resistor 106 convert the received inverted first differential signal (FIG. 3*e*) into the form of an inverted second differential signal (FIG. 3*f*).

The inverted second differential signal across resistor 106 is fed to the control grid 110 of an electron tube 111 connected in the differentiating stage 104 as a peaking voltage amplifier. The output of the tube 111 is taken from the plate 112 thereof and fed by a conductor 113 to the D.C. amplifier stage 42. In amplifier stage 42 the signal on conductor 113 is supplied through a blocking condenser 114 to the control grid 115 of an electron tube 116 in the amplifier stage.

The control grid 115 of electron tube 116 receives by way of lead 41 the additional input of the image-carrying yellow signal from the yellow signal modifying circuits 38. This image-carrying signal, taken alone, appears at the plate 117 of tube 116 in the form shown by FIG. 3*c*. Also the inverted second differential signal across resistor 106 undergoes two inversions by passage through tubes 111 and 116 to appear at the plate 117 in the form of FIGURE 3*f*. Hence, at the output of amplifier stage 42 the inverted second differential signal and the main channel signal are superposed to produce the combined signal of FIGURE 3*g*.

As explained, when a visual replica is reproduced from this combined signal through the action of the yellow glow lamp 43 in response thereto, much of the original edge sharpness which is lost in the yellow channel circuits will be restored with regard to the appearance of the replica.

Actually, as stated, it is found desirable in practice to so adjust the differentiating stages 96 and 104 that over-accentuation for the loss of sharpness occurs, i.e., the boundaries between light and dark portions of the picture are overdone so that sharpness is increased. This tends to compensate for loss of picture edges in the halftone printing process.

It has also been found desirable to supply the peaking voltage from the conductor 113' in the magenta channel through a conductor 120 and a condenser 121 to the control grid 122 of an electron tube 123 in the black printer amplifier 49.

By obtaining, as described, the inverted second differential signals from the photomultiplier signals in each of the color channels, and by superposing each inverted second differential signal, on its corresponding delayed image-carrying color signal, the loss of sharpness of transverse edges is largely corrected for. In this regard, in the case of the black channel, it will be noted that the edge correcting differential signal therefor is derived from a color channel (magenta) other than the black channel itself. Thus it is apparent that as to edge sharpness one color channel may furnish the correcting signal for another. Also, to be noted is the fact that as to the black and magenta channels, a single edge correcting differential signal is used to restore edge sharpness in both of these channels. Thus it is evident that a single edge correcting differential signal may be used to restore edge sharpness in a plurality of color channels.

*Principle of Parallel Edge Correction*

The edge sharpening circuits described above, while of themselves highly effective in sharpening transverse edges, are not effective for the sharpening of parallel edges. The present invention is also adapted, however, to restore the sharpness of parallel edges in the manner to be described forthwith.

Referring to FIGURE 8, there is shown a portion 125 of a scanned visual subject having on its surface an edge 126 forming the boundary between light and dark areas 127 and 128 of relatively contrasting tone density. The edge 126 lies parallel to a number of scanning paths *a–h* inclusive for a scanning aperture 129, the paths being taken across the visual subject portion in the direction indicated by the arrow heads on the scanning paths. The direction of advance of scan from one scanning path to the next is indicated by the arrow 130 heading a line 130*a*.

FIGURE 9 shows as a solid graph line, the output of the scanning photocell (for example, the photocell 3 in FIGURE 1) as the aperture 129 (FIG. 8) traverses line 130*a* by one after another of the scanning paths *a–h* (represented in FIGURE 9 as the vertical lines *a'–h'*). Thus, the graph in FIGURE 9 shows the variation of scanning photocell output at line 130*a* as the scanning action advances across the parallel edge.

With regard to this signal graph, when the aperture 129 during scan is disposed in the vicinity of the edge 126 (FIG. 8), the transition line 135' of the graph (connecting the regions 136' and 137' of high and low signal level) does not have the infinite slope necessary to actually represent the substantially instantaneous tone density change occurring at the parallel edge. Instead, the transition line 135' is of finite slope for the reason that the aperture 129 receives light energy from both light tone and tone areas. Hence, it is evident that a signal response such as is shown in FIGURE 9 represents, for image transfer purposes, a loss in edge sharpness as the scanning action advances from one side to the other of a parallel edge.

In view of the foregoing discussion it is apparent that restoration of parallel edge sharpness may be obtained, if to the separate image-carrying signals developed by the scanning photocell at line 130*a* as shown in FIGURE 9, there is added at appropriate times appropriate parallel edge correcting signals to produce combined signals of conjoint edge restoring effect. The combined signals may be plotted, as shown in FIGURE 10, as a dotted graph line, the horizontal ordinate of the figure representing, as before, the advance of the scanning action and the vertical ordinate representing, as before, the amplitude of the scanning photocell output. Note that in FIGURE 10 the graph lines in the figure as before, are intersected by a set of vertical lines *a''–h''*, inclusive, representing positions of advance corresponding to those of scanning paths *a–h*, inclusive, in FIGURE 8.

By representing in FIGURE 10 the uncorrected image-carrying signals of FIGURE 9 as a solid graph line, it is apparent that for each scanning traverse of the visual subject portion 125 (FIG. 8) in a given scanning path, the amount of correcting signal needed to restore edge sharpness is represented by the vertical distance between the solid and dotted graph lines at the horizontal position representing that scanning path. As in the case of transverse edges, preferably the amplitude of the parallel edge correcting signal is adjusted for over-accentuation, in which case relatively contrasting peaks of tone density 138 and 139 are created to either side of the transition line 135'' between the high and low signal level regions 136'' and 137''.

The effect of edge correction by the mode described is shown in FIGURE 11, the figure representing a positive replica 140 of the visual subject portion 125 of FIGURE 8, the replica being reproduced in accordance with the solid line graph of FIGURE 10. In FIGURE 11 it will be noted that to either side of a boundary 141, representing the true position of the edge 126 on the original subject 125, there are formed tone density accentuated light and dark marginal strips 142 and 143 between, respectively, the boundary 141 and the light and dark areas 144 and 145. Strips of this type mutually act, as described, to accentuate the tone density contrast of the original areas. The strips 144 and 145 thus serve to heighten the appearance of an edge presence to the viewer of the replica.

*Parallel Edge Optical System*

To generate for superposition upon the uncorrected image-carrying signals (solid graph line FIG. 10), the amounts of correcting signal necessary to produce the combined, edge restoring signals (dotted graph line FIG. 10), there is employed (FIG. 12) a pre-scanner optical system. In this optical system a transparency 150 of the visual subject to be scanned is mounted upon the face of a hollow transparent drum 151 adapted to rotate about a vertical axis. Light originating from a source 152 within the drum is brought by a condensing lens 153 to a focus to form a high intensity light spot 154, the spot being so fixedly positioned in space that the transparency 150 passes through the spot for each rotation of the drum. Concurrent with its rotary motion, the drum 151 is advanced in translation upward along its vertical axis in a step-by-step motion. The combined rotary and translatory motions of the drum 151 causes the spot 154 to trace out across the transparency 150 a set of horizontal paths advancing downward successively from one path to the next. Thus, it will be seen that the spot 154 in effect causes a scanning action with respect to the visual subject.

The main body of light emanating from the high intensity spot 154 is directed by an objective lens 155 through the aperture of a diaphragm 156, and from thence to the scanner mechanism 30 (FIG. 1). A part of the light passing through the objective lens 155, however, is intercepted by a planar mirror 157 fixedly disposed in the center of the optical path and tilted at an angle to deflect the light received thereby to one side of the main optical path.

The light deflected by the planar mirror 157 is directed towards the planar face of a vibrating mirror 159 adapted to be driven at a speed of 15 kilocycles by a high speed galvanometer assembly 160 to be later described. Vibrating mirror 159 is mounted to sinusoidally oscillate in space about an axis normal to the plane of the drawing. The light received by mirror 159 is reflected therefrom to fall upon the surface of a diaphragm 161 having a small aperture formed therein.

It will be appreciated that, while the entire bundle of light rays reflected by mirrors 157 and 159 and falling upon diaphragm 161 represents an image of an area 161*a* on transparency 150 considerably exceeding that illuminated by high intensity spot 154, the light passed by the aperture of diaphragm 161 represents, with respect to this image, only a small portion thereof, the portion having the same order as to size as spot 154. Since the large size image falling upon diaphragm 161 is swept back and forth thereover by the oscillation of mirror 159, it follows that the portion of image subtended by the aperture of diaphragm 161 represents a small size moving area of transparency 150, the small size area sweeping in a vertical direction and with simple harmonic motion through the high intensity spot 154 as a center.

Thus it may be considered that the aperture of diaphragm 161 defines, in terms of the light passing therethrough, a small auxiliary sampling spot 162 which sinusoidally oscillates in a vertical strip above and below a center position coincident with the main scanning spot 154. In terms of the scanning of transparency 150, therefore, the center of the auxiliary sampling spot 162 may be considered to follow over the transparency a sinusoidal path symmetrically disposed about and simultaneously generated with each separate horizontal scanning path generated over the transparency by the main scanning spot 154. This movement, described, of the sampling spot 162 with respect to the transparency 150 results in a continuous sampling of a small width of the visual subject to either side of each horizontal scanning path.

The light passing through the aperture of diaphragm 161 is received by phototube 163, hereafter referred to as the "edge" phototube. The light rays so received by the edge phototube 163 are properly focused upon the receiving surface thereof by virtue of the focusing action of the objective lens 155, the focusing effect of which is not affected by reflection of the light rays from the faces of mirrors 157 and 159.

The photocell 163 responsive to the received light energy converts the same into electric signals. Since mirror 159 is driven at a 15 kc. rate, the output signals of photocell 163 will have a 15 kc. fundamental frequency along with harmonic components of this frequency.

*The Parallel Edge Circuits*

The output signal of the edge photocell 163 is fed by a lead 170 (FIGURES 1 and 13) to the parallel edge circuits section 47 where it is applied to the control grid 171 (FIG. 13) of the triode amplifier 172. The output of triode section 172 is connected through a 30 kc. band pass filter 173 to control grid 174 of another triode section 175 connected in a conventional manner as an amplifier. In passing through this band pass filter 173, the signal originating with the edge phototube 163 is modified to eliminate the fundamental and all harmonic components thereof except for the second harmonic or 30 kc. component.

The resulting second harmonic signal continues from the output of triode section 175 through two successive amplifying stages consisting of the triode section 176 connected as a conventional amplifier and the triode section 177 connected as a conventional amplifier. At the output of this latter triode section 177 the second harmonic signal excites the primary winding 178 of a transformer 179, the secondary or "edge signal" winding 180 of which is connected into a polarized rectifier circuit 181. The second harmonic signal is thus coupled over into the polarized rectifier circuit 181.

The parallel edge circuit section 47 contains, as another component circuit thereof, a triode section 185 connected in a conventional manner as a tuned plate oscillator 186 with a 15 kc. signal. A portion of this 15 kc. signal is extracted as a first output from the oscillator 186 by a coil 187 inductively coupled to the plate inductor 188, of the oscillator. The 15 kc. signal induced in this coil 187 is supplied through a variable tapped resistor 189 and the tap 190 thereof to the high speed galvanometer 160 to furnish the driving energy therefor. By adjusting the position of the tap 190 along the resistor 189 the amount of energy supplied to the gavanometer 160 can be varied to selectably adjust the oscillatory swing of the vibration mirror 159 (FIG. 12).

As a second output, the tuned plate oscillator 186 supplies, by a conventional coupling means, a 15 kc. signal to the control grid 195 of a triode section 196 connected in a conventional manner as a frequency doubling amplifier circuit. The 30 kc. signal yielded by this triode section 196 (by virtue of its frequency doubling action) is applied to the control grid 197 of another triode section 198 connected as a conventional cathode follower. The 30 kc. signal appearing at the cathode 199 of this triode section 198 excites the primary coil 200 of a transformer 201 having two secondary or "control voltage" windings 202 and 203, each winding being connected into the polarized rectifier circuit 181. The 30 kc. signal derived directly from oscillator 186 is thus coupled over into the polarized rectifier circuit 181.

Considering now in more detail the polarized rectifier circuit 181, the heart of the circuit consists of a triode section 205 having a plate 206, cathode 207 and control grid 208 and another triode section 210 having a plate 211, cathode 212, and control grid 213, the two triode sections 205 and 210 being connected in reverse parallel relation in a loop circuit 215. The other components of this loop circuit 215 consist of a resistor 216, a load 217 composed of two thyrite resistors 218, 219 in series and the edge signal winding 180. In loop circuit 215, elements 216, 217 and 218 are in series with each other, with triode sections 205, 210 being connected (in the loop) to one end of resistor 216 and one end of edge signal winding 180.

It is evident that the 30 kc. second harmonic signal induced in the edge signal winding 180 has a voltage which changes in direction for each half cycle. In the half cycle for which the edge signal voltage tends to force current around the loop circuit 215 in the clockwise direction, the triode section 205 will conduct current if the potential of its control grid 208 permits it to do so, but (resulting from its rectifying characteristic) the triode section 210 will not conduct irrespective of the potential on its control grid. Conversely, in the half cycle for which the edge signal voltage tends to force current around the loop circuit 215 in the counterclockwise direction, the triode section 210 will conduct if the potential on its control grid 213 permits it to do so, but the triode section 205 will not conduct irrespective of the potential on its control grid.

The control voltages for the two reverse parallel connected triode sections 205 and 210 are respectively furnished by the control voltage windings 202 and 203, the winding 202 being connected between the control grid 208 and cathode 207 of the triode section 205, while the winding 203 is connected between the control grid 213 and the cathode 212 of the triode section 210. The two control voltage windings 202 and 203 are so respectively coupled to the triode sections 205 and 210 that both windings furnish "in phase" control voltages to their respective triode sections.

With regard to the relations between the control voltages furnished to the triode sections 205, 210 by the control voltage windings 202, 203, and the edge signal voltages furnished to these sections by the edge signal winding 180, it is evident that the 30 kc. signals induced in the control voltage windings are synchronously locked with the 15 kc. signal of the tuned plate oscillator 186. Moreover, the 30 kc. second harmonic signal induced in the edge signal winding 180 is also synchronously locked with the 15 kc. signal of the oscillator 186, by virtue of the cause and effect concatenation that this 30 kc. signal is the second harmonic of the output signal of the edge photocell 163, the photocell signal is generated by the oscillatory action of the vibration mirror 159, the mirror 159 is driven by the high speed galvanometer 160 and the driving energy for the galvanometer 160 is furnished from the 15 kc. oscillator. Hence, the control voltage signals in the windings 202, 203 and the edge signals in the winding 180 bear a synchronous relation to each other.

Assuming, however, that the signals of the control windings establish a "reference phase," the signal in the edge signal winding 180 may either have a voltage of reference phase, zero voltage, or a voltage 180° displaced from reference phase, this latter condition being referred to hereafter as one of "inverse phase." In FIGURE 13, the convention is adopted that, as to the edge signal winding 180, a voltage of reference phase tends to drive current in the direction shown by the solid line arrow 225 while a voltage of inverse phase tends to drive current in the direction of the dotted line arrow 225'. With respect to the plurality of possible edge signal phases, the various fact situations respectively causing the same will be treated hereafter, it being necessary now to know only that different phase conditions are so produced.

Over a full cycle of voltage alternation in the control voltage windings 202, 203, it is evident that for a half cycle thereof the grid-cathode bias of both triode sections 205, 210 will be negative, and that therefore, neither triode section can conduct, whatever the phase of the edge signal voltage. For the remaining half cycle, however, there will be a simultaneous, positive, grid-cathode bias for both triode sections 205 and 210. In this situation, if the voltage induced in the edge signal winding 180 is in reference phase (as shown by the solid line arrow 225), the triode section 205 will conduce while the other triode section 210 remains non-conductive. As a result, current circulates clockwise around the loop circuit 215 to produce a positive voltage drop (as shown by the solid line arrow 230) across the load 217. If, conversely, the voltage induced in the edge signal winding 180 is of inverse phase (as shown by the dotted line arrow 225'), the triode section 210 will conduct, while the other triode section 205 remains non-conductive. In this latter case, current circulates counterclockwise around the loop circuit 215 to cause a negative voltage drop (as shown by the dotted line arrow 230') across the load 217. Of course, in the situation where no voltage is induced in the edge signal winding 180, no current will circulate around the loop circuit 215 and no voltage will be generated across the load 217.

Since one or the other of the triode sections 205, 210 conducts, if at all, only during the positive half cycle for the control voltages, it is evident that the current caused to circulate around loop circuit 215 assumes the form of a set of similar polarity half cycles for an alternating wave, the current half cycles being of positive or negative polarity as to load 217 in dependence on which one of triodes 205, 210 conducts. To smooth out the pulsations of this type of circulatory current, a condenser 235 is connected in shunt across the series coupling of resistor 216 and load 217. The condenser 235 and the resistor 216 together serve to average out the pulsations in the loop circuit current to accordingly produce across the load 217 a smooth D.C. voltage, having respectively a positive and a negative polartiy in response to an edge signal of reference and inverse phase.

Considering the quantitative relation between the amplitude of the edge signal in winding 180 and the amplitude of the voltage appearing across the load 217, the series connected thyrite resistors 218, 219 have a resistivity characteristic logarithmically related to the applied voltage. Since the voltage applied across resistor 216 and load 217 is substantially that of the edge signal, there may be obtained the approximate expression:

$$V_L = kV_p n$$

where $V_L$ is the amplitude of the load voltage, $V_p$ the peak amplitude of the edge signal voltage, $k$ is a constant, and $n$ is a fractional exponent. Thus the load 217 acts as a compression circuit to prevent the introduction of an over-exaggerated edge correcting effect responsive to high tone density contrast between two areas bordering a parallel edge.

Since the second harmonic edge signal and the second harmonic control voltage signals are respectively injected into the polarized rectifier circuit by means of transformers 179 and 201, it is evident that insofar as these two signal couplings are concerned the polarized rectifier 181 is completely free to float in potential. The rectifier circuit, however, is connected at the juncture of condenser 235 and thyrite resistor 219 to the cathode 240 of a triode section 241 connected as a conventional cathode follower. The control grid 242 of triode section 241 receives, as an output of a triode section 243 (connected as a conventional D.C. amplifier) the image-carrying signal (FIG. 9) of the black color channel, the input of triode section 243 being supplied from limiter 45 (by the lead 46) with the invert of this signal. Thus from the cathode follower action triode section 241 the black image signal appears between cathode 240 and ground, causing the rectifier circuit 181 to exactly follow (as to the potentials of its internal circuits with respect to ground) the amplitude of the black image signal. Accordingly, the voltage with respect to ground appearing at the juncture of the resistor 216 and the thyrite resistor 218 represents, in voltage, the sum of the image-carrying black signal and the parallel edge correcting signal appearing across the load 217.

The combined signal produced by the super position of the black image-carrying signal and the correction signal in the manner described is supplied to the input of a triode section 244 connected as a conventional phase inverting D.C. amplifier. From the output of triode section 244, the inverted combined signal is supplied to the control grid 245 of a triode section 246 connected in a conventional manner as a cathode follower. From the cathode 247 of this cathode follower triode section 246, the inverted combined signal representing the output of parallel edge detector circuits 47 (FIG. 1) is supplied by the lead 48 to the black channel D.C. amplifier 49.

*Operation for Parallel Edge Correction*

By way of fuller explanation of the mode by which the pre-scanner optical system and parallel edge detector circuits restore the sharpness of parallel edges, reference is made to FIGURES 14*a*–18*a*, inclusive, 14*b*–18*b*, inclusive, and 14*c*–18*c*, inclusive. In these drawings, FIGURES 14*a*–18*a* are respectively associated with the solid line portions (designated by unprimed letters) or FIGURES 14*c*–18*c*, while FIGURES 14*b*–18*b* are respectively associated with the dotted line portions (designated by primed letters) of FIGURES 14*c*–18*c*.

FIGURES 14*a*–18*a* represent a portion of a visual subject 250 having thereon an edge 251 lying parallel to the scanning direction taken across the portion and forming a boundary between an upper light area 253 and a lower dark area 254. Viewing these figures in order from top to bottom, the visual subject portion 250 is traversed by a succession of horizontal scanning paths 255–259, each path being traversed in a direction from lett to right, as shown by the arrow head 260. In each figure the scanning path traversing the same is displaced below the path of the figure above to give a direction of advance for the scanning action as shown by the arrow 261. In all the figures the solid line square 262 represents the part of the visual subject seen by the vibrating mirror 159 (FIG. 12) at the zero position for each sampling cycle thereof, while the dotted line squares 263 and 264 represent the part of the visual subject 250 seen respectively for the maximum upward swing and maximum downward swing of the vibrating mirror 159.

In FIGURES 14*c*–18*c* each of the figures shows three separate signals designated, respectively, as I, II and III, and representing, respectively, the output signal of edge detecting photocell 163, the second harmonic content of this signal, and the resulting signal across load 217 of polarized rectifier 181. For each of signals I, II, III the horizontal ordinate thereof represents distance taken along a horizontal scanning path, while the vertical ordinate thereof represents various signal amplitudes measured from respective base lines, each designated by the letters "B.L."

Figures 14A, 14B, 14C, 15A, 15B, 15C, 16A, 16B, 16C, 17A, 17B, 17C, 18A, 18B, 18C:
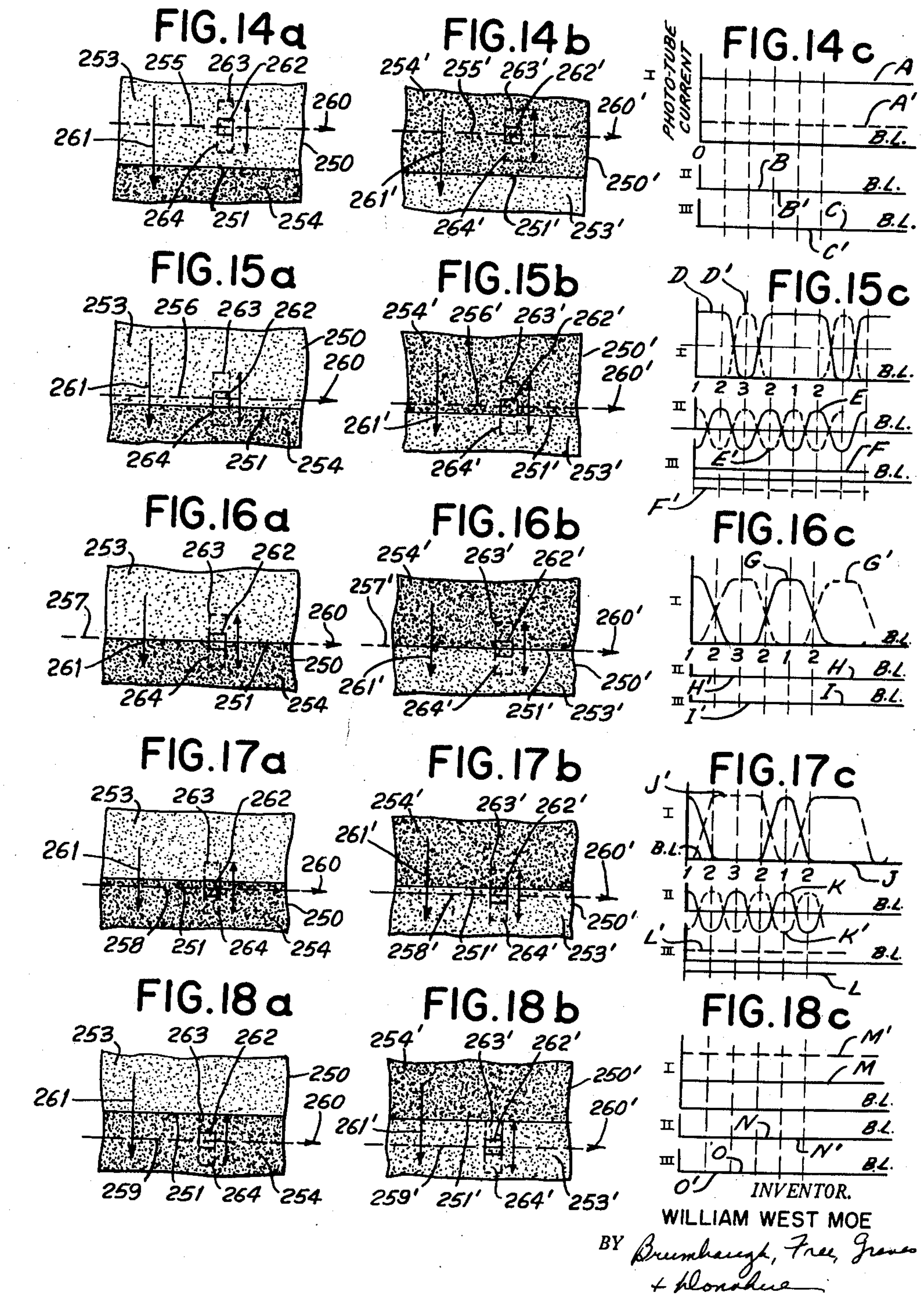

Treating the figures in detail, in FIGURE 14*a* the vibrating mirror 159 (FIG. 12) through each full cycle of oscillation sees exclusively the light area 253. In consequence, the edge detecting photocell 163 (FIGS. 1 and 12) throughout a scan along path 255 receives constant light energy to produce a constant level output signal (FIG. 14*c*, wave form A). This constant level signal has zero second harmonic content (FIG. 14*c*, wave form B). Accordingly, the signal across load 217 of polarized rectifier 181 (FIG. 13) is of zero voltage (FIG. 14*c*, wave form C).

In FIGURE 15*a* the scanning path 256 traversing the visual subject portion 250 has moved towards the dark area 254 to the extent where the vibrating mirror 159 for a part of its downward swing views this dark area. For the interval for which the dark area 254 is seen, the light energy received by the edge detecting photo-cell 163 decreases. The photocell output signal for this interval, therefore, drops from its high, light tone level (FIG. 15*c*, wave form D), the signal during the period of drop substantially following in form the 15 kc. sinusoidal wave which, through the galvanometer 160 (FIG. 12) drives the vibrating mirror 159. The photocell output signal, accordingly, has a wave form which is rich in a second harmonic component of the reference phase (FIGURE 15*c*, wave form E). This second harmonic component is converted (as previously described) by the polarized rectifier 181 (FIG. 13) into a D.C. edge correcting signal of positive polarity across the load 217 thereof (FIG. 15*c*, wave form F) for application, as described, to the main image-carrying signal (FIG. 9) to produce a light tone density peak 138 (FIG. 10).

In FIGURE 16*a*, the scanning path 257 taken across the visual subject 250 coincides with the parallel edge 251 upon that subject. In consequence, the vibrating mirror 159 during each complete sampling cycle sees equal amounts of the dark area 254 and the light area 253 to cause the edge detecting photocell 163 to produce an output signal symmetrical as to intervals in which the signal assumes light tone and dark tone levels (FIG. 16*c*, wave form G). As is well known, a signal of this sort has substantially no second harmonic content (FIG. 16*c*, wave form H), and the polarized rectifier 181 (FIG. 13) accordingly produces across its load 217 a zero edge correcting signal output (FIG. 16*c*, wave form I). The situation shown by FIGURES 16*a* and 16*c* accordingly represents for the main image-carrying signal the center point for the transition line 135″ between light tone and dark tone levels 136″ and 137″ (FIG. 10).

In FIGURE 17*a* the scanning path 258 is so advanced that the vibrating mirror 159 over a sampling cycle sees the light area 253 only for a portion of its upward swing. For the interval for which this light area is thus seen, the light energy received by the edge detecting photocell 163 increases. Hence, for this interval the output signal from the photocell will rise upwards from a dark tone level (FIG. 17*c*, wave form J), the signal during the period of rise substantially following in form the 15 kc. driving signal for the vibrating mirror 159. The output signal of the photocell 163 accordingly will be rich in second harmonic component of the inverse phase (FIG. 17*c*, wave form K). This inverse phase second harmonic component is converted (as described) by the polarized rectifier 181 (FIG. 13) into a D.C. signal of negative polarity (FIG. 17*c*, wave form L) for application of this latter signal to the main image-carrying signal (FIG. 9) to produce a dark tone density peak 139 (FIG. 10).

In FIGURE 18*a* the scanning path 259 has advanced to the extent where the vibrating mirror 159 during a full sampling cycle sees exclusively the dark area 254. The light energy received by the edge detecting phototube 163 will accordingly be low in amount and of constant value. In consequence, the photocell output signal will be a constant low dark tone level (FIG. 18*c*, wave form M), the signal having zero second harmonic content (FIG. 18*c*, wave form N). It follows in this case that the polarized rectifier 181 (FIG. 13) produces zero edge correcting signal across its load 217 (FIG. 18*c*, wave form O).

FIGURES 14*b*–18*b*, inclusive, are respectively analogous as to subject matter with FIGURES 14*a*–18*a*, each feature in the latter group of figures being identified by the primed designation of the counterpart feature in the former group of figures. The principal distinction between the two groups of figures is that in FIGURES 14*b*–18*b* the scanning paths 255′–259′ in traversing the visual subject portion 250′ advance from a dark area 254′ to a light area 253′. With this latter type of advance signals will be derived characterized by the dotted line wave forms of FIGURES 14*c*–18*c*. In view of the foregoing discussion, the significance of these wave forms are, for the most part, self-evident. Of note, however, is the fact that, in contrast to the situations shown by FIGURES 15*a* and 17*a*, where there are respectively produced, second harmonic signals of reference phase (FIG. 15*c*, wave form E) and inverse phase (FIG. 17*c*, wave form K), the situations shown by FIGURES 15*b* and 17*b*, respectively, produce second harmonic signals of inverse phase (FIG. 15*c*, wave form E′) and reference phase (FIG. 17*c*, wave form K′). It follows that in the separate cases of light to dark scan advance and dark to light scan advance, the time occurrence of the positive and negative polarity edge correcting signals is reversed. (Compare FIG. 15*c*, wave forms F and F′ and FIG. 17*c*, wave forms L and L′.) As a matter of space occurrence, however, in both cases the proper edge correcting signals are obtained since in both cases there is applied to the image-carrying signal (FIG. 10) a light tone correction 138, between the transition line 135″ (representing the edge) and the light tone level proper 136″, and a dark tone correction 139 between the transition line 135″ and the dark tone level proper 137″.

It should also be noted that the pre-scanner optical system and the polarized rectifier 181 operate to produce the proper edge correcting signals, whether there is right hand or left scan advance. FIGURES 14*a*–18*a* and 14*b*–18*b* show right hand scan advance, the direction of advance from one scanning path to the next being right handed with respect to the travel direction along each scanning path. Left hand scan advance from a dark to a light area, however, can be visualized if FIGURES 14*a*–18*a* are considered in order from bottom to top. In such case the solid line wave forms of FIGURES 14*c*–18*c* will be produced in corresponding order from bottom to top to yield the proper edge correcting signals for the scanning situation presupposed. Similarly, left hand scan advance from a light to a dark area is visualized by reading FIGURES 14*b*–18*b* from bottom to top. Again, it is evident, for the given scanning situation, that the proper edge correcting signals are produced.

During a scanning action advance across a parallel edge, for any given sampling cycle of mirror 159, the amplitude of the signal across load 217 (excluding from consideration the compression effect of thyrite resistors 218, 219), may be approximately determined by the expression $$A=Kg(t_d-t_l)\left[\text{sine}\,\pi\left(1+\frac{s_d-s_l}{s}\right)\right]$$

where A is the signal amplitude, $s$ the length (transverse to the scanning path) of the strip of visual subject seen by mirror 159, $s_d$ and $s_l$ the respective transverse lengths of the dark and light tone portions seen in the whole length $s$ of the mentioned strip, $t_d$ and $t_l$ the average tone densities of the dark and light tone portions, $g$ the signal gain factor between the light receiving input of edge phototube 163 and the output of the parallel edge circuits 47, and K is a constant.

In the expression above set forth the term $s_d-s_l$ represents the comparative dominance for the length $s$ of the whole strip between the length $s_d$ of the dark tone portion and the length $s_l$ of the light tone portion. If $s_d$ is less than $s_l$, so that the light tone portion dominates the dark, then the sine function (enclosed in brackets in the above expression) will have a positive value producing a positive amplitude (or high level for the signal). If $s_d$ equals $s_l$, so that the dark and light tone portions are evenly balanced, with no dominance of one or the other, then the sine function will have a value of zero yielding zero signal amplitude. Finally, if $s_d$ is greater than $s_l$, so that the dark tone portion dominates the light, then the sine function will have a negative value, producing a negative polarity (or low level) for the amplitude of the signal. Thus the amplitude and polartiy of the signal across load 217 (or, equivalently, the level manifested thereby) depends primarily upon which one of two relatively light and dark tone portions in the length of strip scanned by mirror 159 dominates the other portion.

In the expression above set forth the term $t_d-t_l$ represents the contrast between the average tone densities of the light tone and dark tone portions detected. As will be seen, the amplitude of the signal varies directly with the tone density contrast present. Also, it will be seen that in the expression above set forth the signal amplitude A varies directly with the signal gain factor present. Over the expected range of tone density contrast, therefore, the desired amount of edge-accentuating effect may be produced by preselecting, through adjustment of the plate voltage on phototube 163, the value of signal gain which is appropriate.

As stated, the output signal of parallel edge circuits 47 represents in the inverse from the black image-carrying signal superposed (in the presence of a parallel edge) with an appropriate paralltl edge correcting signal. This inverted combined signal is supplied by lead 48 (FIG. 1) to the control grid 122 of triode section 123 in black D.C. amplifier stage 49. In passing through amplifier 49, the signal on grid 122 is re-inverted to appear on the output lead 50 of amplifier stage 49 as an upright combined signal (dotted line graph of FIG. 10) characterized by restored parallel edge sharpness. It will be recalled that (as hitherto described) by virtue of the transverse edge correcting signal supplied to control grid 122 by lead 120, the signal on output lead 50 is also characterized by restored transverse edge sharpness. Hence the signal on lead 50 actuates black glow lamp 51 to expose a black half-tone separation characterized by both restored transverse and restored parallel edge sharpness.

It will be understood that by combining the transverse and parallel edge correcting signals in the mode described, proper edge correction is obtained whether the edge scanned is truly transverse, truly parallel or is (as is more often the case) a skewed edge having transverse and parallel edge components. Moreover, in view of the fact sharpness for any orientation of the scanned edge, it is apparent that proper edge correction is attained whether the edge is of straight line or of other configuration.

With regard to this combining together of transverse and parallel edge correcting signals, there may have already been noted in the foregoing discussion certain aspects commonly characterizing both the means for obtaining transverse edge correction and the means for obtaining parallel edge correction. That each type of edge correction has an apparent resemblance to the other as to the features thereof stems from the fact that the two apparently different edge correcting means may be shown to reduce essentially to one fundamental mode of obtaining edge correction, whether the edge detected be transverse, parallel or skewed. The nature of this fundamental edge correcting mode will be brought out by the following discussion.

Considering, first, only pure transverse and parallel edges, assume that the edge correcting effect takes place with regard to a short length of edge. In the transverse case the edge of short length may be thought to be a portion of the edge 59 in FIG. 2 which is traversed by the scanning aperture 56. In the parallel case the edge of short length may be thought to be a portion of the edge 126 in FIG. 8 which underlies the scanning aperture 129 when the same views the edge 126 at the line 130*a*.

If the edge is transverse to the scanning direction (FIG. 2), the scanning aperture crosses the short length of edge by its movement in a single scanning path. If the edge is parallel to the scanning direction (FIG. 8), the scanning aperture crosses the short length of edge by an advance of the scanning paths in the direction of arrow 130 such that the aperture for at least one scan views a portion of the visual subject which contains the short length of edge. In either case, however, the progress of the aperture in crossing the edge is such that the aperture views first an area of aperture size to one side of the length of edge, then a similar size area including the length of edge, and finally a similar size area to the other size of the length of edge. The image signals derived from these separate areas will represent the edge as a change in signal level over time. However, the image signal which is produced from each aperture size area represents an unresolved mixture of light from the details within each area, of particular interest being the one or more unresolved light mixtures derived both from the length of edge itself and from other details within the one or more edge-containing, aperture size areas Hence, as the aperture crosses the edge by progressing, one after another, through the aperture size areas, the change in level of the image signals from the areas will be (as more fully discussed heretofore) a gradual change in level which is not a satisfactory electrical representation of the tone density transition of the edge.

Whether in the transverse edge or parallel edge case, the loss in sharpness of the edge as electrically represented is corrected for by utilizing a sensing system which, in the course of progress of the aperture through the mentioned areas, senses the presence of length of edge to develop sharpening signals which vary in signal level over time as the inverted second differential of the change in image signal level over time. In the transverse edge case, the significant part of the sensing system which is effective is comprised essentially of the differential circuits 96 and 104 (FIG. 1), while in the parallel edge case, the part of the sensing system which is effective is comprised of the optical apparatus of FIG. 12 and the electrical apparatus of FIG. 13. The inverted second differential change in signal level is represented in the transverse edge case by the wave form of FIG. 6*f*, and in the parallel case by the difference in amplitudes between the solid and dotted graph lines of FIG. 10. In either case, the sharpening signals developed by the subsystem are added to the image signals developed by the electro-optical scanning unit to give an improved electrical representation of the sharp tone density transition of the length of edge.

While the basic mode for obtaining edge correction has been limited in the description above to refer to pure transverse or parallel edges only, the principles involved pertain equally well to edges at skew angles to a scanning direction or to a direction of scanning advance. Hence, it will be seen that the described basic manner of edge correction attainment is by its nature of general application to edges of any orientation upon a visual subject.

Ordinarily, to attain the desired restoration of parallel edge sharpness, it is not necessary to apply the parallel edge correcting signal to any color channel other than the black. This fact obtains for the reason that in the manufacture of color print from a set of color separations, the black separation dominates the others in determining, for a viewer, the visual appearance of the color print. Thus to the eye the edge sharpness of the black separation may be made sufficient to compensate for the loss of edge sharpness in the other color channels, while at the same time the problem is avoided of registering sharp edges in all four color separations. For applications where desirable, however, an appropriate amount of parallel edge correcting signal may be supplied to one or more of the color channels in the same mode as hitherto described for the black channel.

*The High Speed Galvanometer*

Turning now to the structure of the high speed galvanometer 160 (FIG. 12), as shown in FIGURES 19 and 20 a pair of magnetically conducting, longitudinal yoke bars 260 and 261 spaced apart from each other in opposite parallel relation, are adjustable towards and away from each other by a conventional supporting and adjusting means (not shown). Means is provided for inducing magnetic flux of opposite polarity in the two yoke bars. For example, the two yoke bars by adjustment towards each other may be adapted to clamp between themselves a transversely extending permanent magnet 262 (made, for example, from Alnico) having a north pole proximate the yoke bar 260 and a south pole proximate the yoke bar 261.

The two yoke bars, at corresponding ends thereof, respectively support north and south pole pieces 264 and 265 in such relation that the two pole pieces extend transversely towards each other. Both the pole piece 264 and the pole piece 265 are adjustable in transverse extension by means of respective set screws 266, 267, passing through respective open slots 268, 269 in the outer faces of the pole pieces 264, 265 to enter (in threaded relation) respective holes 270, 271 formed in the ends of the yoke bars.

The two pole pieces 264, 265 are characterized by respective bifurcations 272, 273 at intermediate extension positions for the pole pieces, the bifurcation 272 dividing the pole piece into an upper finger 274 and a lower finger 276, and the bifurcation 273 similarly dividing the pole piece into an upper finger 275 (FIG. 19) and a lower finger 277.

Considering the pole piece 264, the upper finger 274 thereof assumes a hook-like form, the surface 278 of the finger, as seen in FIGURE 20, curving away rearwardly in transverse extension to keep at a distance the longitudinal center line 280 of the galvanometer assembly. When transversely beyond this center line 280 the surface 278 curves forwardly, in continued spaced relation from the center line, to form, as a termination of the finger 276, a north pole tip 282 for this upper finger.

The upper finger 275 (FIG. 19) is radially symmetrical with upper finger 274 as to center line 280. Upper finger 275 curving around the center line on the side opposite from that defined by finger 274. The upper finger 275 terminates in a pole tip 283 disposed in spaced apart and transversely opposite relation from the pole tip 282.

The lower fingers 276 and 277 of the pole pieces 264 and 265 linearly extend transversely towards each other to form at their near extremities respective pole tips 284 and 285. Moreover, pole tip 284 is disposed to directly underlie upper pole tip 283 while lower pole tip 285 is disposed to directly underlie upper pole tip 282. The longitudinally matched pair of pole tips 283, 284 establish between them a magnetic field running from north charged pole tip 284 to south charged pole tip 283 while the longitudinally matched pair of pole tips 282, 285 establish a magnetic field running from north charged pole tip 282 to south charged pole tip 285. The two magnetic fields so established are thus relatively reversed in direction.

In centrally spaced relation between the lower pole tips 284, 285 there is disposed one end portion 290 of a laminated stem 291 aligned with the center line 280 of the assembly. The end portion 290 is adapted to be gripped by a pair of blocks 292, 293 composed of semi-yieldable material (as, for example, plastic resin), the blocks 292, 293 being respectively positioned between the end portion and the lower fingers 276, 277. By adjusting the pole pieces 264, 265 towards each other and thereafter clamping both in place, the two blocks 292, 293 are caused to clamp therebetween the end portion 290.

The stem 291 is formed of four longitudinally extending, stacked, flat laminations 295, 296, 297 and 298. As to these four stem components, the two inner laminations 296, 297 at end portion 290 project linearly beyond the two outer laminations 295, 298 to a point of equidistance between the upper and lower fingers of each pole piece, the projecting portions of laminations 296, 297 forming respectively the flex sections 300, 301. At this point of equidistance the two inner laminations 296, 297 assume right-angle bends to form respectively a pair of mutually diverging, transversely extending, wings 302, 303. Wing 302 is sufficiently long that the extremity thereof lies equidistantly between pole tips 283 and 284 while the extremity of wing 303 is similarly positioned between pole tips 282 and 285.

The wings 302, 303 form together a magnetic armature 305 the motion of which is adapted to drive the vibrating mirror 159. Mirror 159 is affixed in a conventional manner (as by soldering, for example) to the upper sides of wings 302, 303, the rigidity of mirror 159 imparting rigidity to armature 305 along substantially its whole extension.

Driving energy for armature 305 is supplied by an exciting coil 306 encircling the stem 291 and carrying current derived through tap 190 (FIG. 13) from the 15 kc. signal of the oscillator 186.

In operation the 15 kc. signal, in passing through the coil 306, induces in the laminations of the stem 291 a magnetic flux alternating as to polarity at the frequency of the signal. The alternating flux so created causes both ends of armature 305 to simultaneously change magnetic polarity at a 15 kc. rate. The two ends of armature 305, however, are respectively disposed in permanent magnetic fields of opposite direction. In consequence a 15 kc. alternating torque is exerted in the armature 305.

Since the resilience of flex sections 300, 301 permits armature movement to a limited extent, the armature 305 responsive to the torque exerted on it will sinusoidally oscillate in the space between the upper and lower pole tips. Mirror 159 will accordingly be driven at a 15 kc. rate to perform its previously described function in the pre-scanner optical system (FIG. 12).

For the purpose of obtaining maximum driving action from the armature 305, it is advantageous to bring the mass of the flex sections 300, 301, wings 302, 303, and mirror 159, and the resilience of flex sections 300, 301 into mechanically resonant relation at the frequency of the 15 kc. galvanometer driving signal. Tuning for mechanical resonance may be accomplished through adjustment of the length of the flex sections 300, 301 by sliding (prior to clamping of stem 291 into the assembly) the inner laminations 296, 297 longitudinally to thereby change the relative positions thereof with respect to the outer laminations 295, 298. When the relative position yielding mechanical resonance at the 15 kc. driving frequency has been reached, the inner and outer laminations are fixed in this relative position by applying a conventional clamp member 315 to the stem 291 to bind together the component laminations.

The galvanometer construction just described is highly advantageous in that by virtue of the structure thereof a relatively large sized mirror (for example, a square mirror ⅛ inch on the side) may be oscillated at a rate of at least 15 kc. Such high speed oscillation is necessary in a parallel edge correction system to obtain (as described) adequate sampling of a visual subject to either side of a scanning path taken across the subject.

*Ortho-Luminous Edge Correction*

Reverting to the electronic printer of FIGURE 1, in ordinary practice the relative amplitude of the various transverse edge correcting signals are adjusted by conventional means (not shown) so that the amplitude of the black channel correcting current in lead 120 is considerably greater than the amplitude of the color channel correcting currents in, respectively, leads 113, 113′ and 113″. Such amplitude proportioning of edge correcting signals is desirable, since (as explained) a black color separation of pronounced edge sharpness, when combined with other less sharp color separations to form a color print, will give an adequate visual impression of edge sharpness to the color print as a whole. At the same time, the problem of registering sharp edges in all four separations is avoided. To avoid registering difficulties, it may, in fact, upon occasion, be desirable to attain all transverse edge sharpness correction through the black channel, the amplitude of the edge correcting currents in the color channels being reduced to zero.

Where the electronic printer circuits are adjusted to obtain transverse edge sharpness predominantly by means of the black channel, and a single color channel (e.g., magenta) is employed to supply the black channel with the correcting signal, the single color channel may, on occasion, not furnish a sufficient amount of signal to the black to give the desired amount of edge restoration. For example, where, as in FIGURE 1, the black channel edge correcting signal is derived over lead 120 from the magenta color channel, and it happens that the areas bounding a scanned edge produce only a weak magenta image-carrying signal, the signal fed over lead 120 may not be sufficiently strong to give the desired edge correcting effect.

In FIGURE 21, there is shown a modification of the electronic printer circuits in which, for a scanned edge adjoining an area of any color, it is assured that the proper amount of edge correcting signal is supplied to the black channel. In the modification shown, the edge correcting signal on lead 113′ of the magenta channel is coupled to control grid 122 of triode section 123 in black D.C. amplifier stage 49 by the series connection of lead 120, condenser 121 (the circuit to this point being similar to that of FIGURE 1), and a resistor 323 of 1.8 megohms value. The yellow channel edge correcting signal is coupled from lead 113 to control grid 122 by the series connection of lead 321, condenser 322, and resistor 320 of 30 megohms value. The cyan channel edge correcting signal is coupled from lead 113″ to control grid 122 by the series connection of lead 324, condenser 325 and resistor 326 of 6.8 megohms value.

From the foregoing description, it is evident that the black channel is supplied with an admixed edge correction signal derived from all three color channels, the admixed signal producing in the black channel an adequate edge correcting effect responsive to the presence of a scanned edge adjoining an area of any color. It is also evident, however, that inasmuch as resistors 320, 323 and 326 have graded resistance values causing proportional attenuation of the signals passing therethrough, in edge correcting effect the magenta channel influence exceeds the cyan channel influence. Unequal weight is so given to the edge correcting signals from the various color channels for the reason that to the human eye the presence of an edge is least apparent where the edge bounds a "bright" colored area (e.g., yellow) and most apparent where the edge bounds a "dark" colored area (e.g., magenta). Hence, with regard to edge sharpness, in order for a replica to appear to the eye as a true reproduction of the original visual subject, it is necessary that the collective transverse edge correction effect of the three color channels be in ortho-luminous relation, viz. that when different edges adjoining variously colored areas of a visual subject scanned, in each case the three color channels act together to duplicate in the reproduction of the visual subject the degree of edge sharpness psychologically ascribed by the human eye to the original edges of the visual subject. The relative resistance values of resistors 320, 323 and 326 are, in FIGURE 21, properly proportioned to yield this ortho-luminous relation between the three edge correcting signals respectively supplied from the yellow, magenta and cyan color channels.

The specific embodiments shown in the drawings and described in the specification are obviously susceptible of modification within the spirit of the invention. A wide range of equivalent elements will occur to those skilled in the art in place of the various components of the systems disclosed herein. The specific embodiments described, therefore, are to be regarded merely as illustrative and not as restricting the scope of the following claims.

I claim:

1. A mirror galvanometer comprising, a magnetic structure defining two air gaps spaced apart in a dimension, means for sustaining in said gaps fixed magnetic fields respectively running in opposite directions normal to said dimension, a pair of extended flat-faced members of resilient magnetically conductive material with right angle bends therein on bend lines transverse to the extensions thereof, said members being disposed in back-to-back relation to form a T-configuration with a cross arm and a shank, a mirror affixed to both said members along said cross arm to impart rigidity thereto, means to damp the shank of said T-configuration at an adjustable length from said cross arm to provide flex sections between said damping means and cross arm, means for holding said T-configuration relatively fixed with said structure, said T-configuration having its shank aligned transverse to said dimension in the plane defined by said dimension and said directions, and having separate cross arm portions of said members in said two respective gaps, and means for inducing an alternating polarity magnetic charge in said cross arm.

2. A mirror galvanometer assembly comprising, a pair of spaced pole pieces, a pair of fingers extending respectively from said pieces to terminate in a pair of first pole tips therefor, said tips being spaced apart in a dimension, another pair of fingers respectively extending from ones of said pieces to terminate in a pair of second pole tips therefor, each second pole tip being spaced from the first pole tip of the other pole piece in one direction normal to said dimension, all of said pole tips forming together two pairs of matched first and second pole tips with air gaps therebetween, means for inducing magnetic flux in said pieces and fingers to cause opposite polarity fixed magnetic charges in pole tips for different pole pieces, a pair of extended flat-faced members of resilient magnetically conductive material with right angle bends therein on bend lines transverse to the extensions thereof, said members being disposed in back-to-back relation to form a T-configuration with a cross arm and a shank, a mirror affixed to both said members along said cross arm to impart rigidity thereto, means to damp the shank of said T-configuration at an adjustable length from said cross arm to provide flex sections between said damping means and cross arm, means relatively fixing the disposition of said T-configuration with said pole pieces, fingers and pole tips, said T-configuration in said disposition having the shank thereof aligned transverse to said dimension in the plane defined by said dimension and said directions, and having separate cross arm portions of said members respectively disposed in said gaps, and means for inducing an alternating polarity magnetic charge in said cross arm.

3. Apparatus comprising, a horizontal armature member having first and second separated portions and supported centrally of said portions to be tiltably movable in a vertical plane, a first pole piece having a pair of pole tips disposed in said plane over and under, respectively, said first and second portions, a second pole piece having a pair of pole tips disposed in said plane under and over, respectively, said first and second portions to form a pair of air gaps with the pole tips of said first piece, means to impart opposite unchanging polarity magnetic charges to said pole pieces to thereby produce oppositely directed magnetic fields in said two air gaps, and winding means magnetically coupled with said member and responsive to an electric current signal applied thereto to impart a magnetic charge of the same magnetic polarity to each of said portions of said member, said charge and said fields being adapted together to produce torque on said member.

References Cited in the file of this patent

UNITED STATES PATENTS

| | | |
|---|---|---|
| 1,573,739 | O'Neill | Feb. 16, 1926 |
| 1,637,442 | Dorsey | Aug. 2, 1927 |
| 1,930,677 | Floyd | Oct. 17, 1933 |
| 1,932,520 | Horsch | Oct. 31, 1933 |
| 2,059,159 | Whitaker | Oct. 27, 1936 |
| 2,127,427 | Scheldorf | Aug. 16, 1938 |
| 2,163,195 | Edwards | June 20, 1939 |
| 2,432,424 | Hyland | Dec. 9, 1947 |
| 2,454,425 | Bauer | Nov. 23, 1948 |

FOREIGN PATENTS

| | | |
|---|---|---|
| 823,527 | Germany | Dec. 3, 1951 |

UNITED STATES PATENT OFFICE

CERTIFICATE OF CORRECTION

April 10, 1962

Patent No. 3,029,387

William West Moe

It is hereby certified that error appears in the above numbered patent requiring correction and that the said Letters Patent should read as corrected below.

Column 5, line 58, for "paritcularly" read -- particularly --; line 67, for "illustration" read -- illusion --; column 10, line 68, for "gavanometer" read -- galvanometer --; column 13, line 52, for "lett" read -- left --; column 15, line 38, after "left" insert -- hand --; column 16, line 32, for "paralltl" read -- parallel --; line 53, after "fact" insert -- that the edge correction system described restores edge --.

Signed and sealed this 24th day of July 1962.

(SEAL)
Attest:

ERNEST W. SWIDER
Attesting Officer

DAVID L. LADD
Commissioner of Patents